United States Patent [19]
Hatano et al.

[11] Patent Number: 5,648,558
[45] Date of Patent: Jul. 15, 1997

[54] METHOD FOR PRODUCING A POLYOXYALKYLENE GLYCOL AND NOVEL METALLO-ALUMINOSILICATE

[75] Inventors: Masakatsu Hatano; Akio Nakanishi; Yoshio Kabata, all of Yokohama; Masayuki Shirado, Yokkaichi; Hiroshi Takeo, Yokkaichi; Mitsuharu Kobayashi, Yokohama, all of Japan

[73] Assignee: Mitsubishi Chemical Corporation, Tokyo, Japan

[21] Appl. No.: 213,706

[22] Filed: Mar. 16, 1994

[30] Foreign Application Priority Data

Mar. 16, 1993 [JP] Japan ................................. 5-055696
Dec. 22, 1993 [JP] Japan ................................. 5-324270

[51] Int. Cl.$^6$ .......................... C07C 43/11; C07C 67/24; C08G 63/06
[52] U.S. Cl. .......................... 568/618; 528/361; 560/240
[58] Field of Search .......................... 568/618; 560/240; 528/361

[56] References Cited

U.S. PATENT DOCUMENTS

| | | | |
|---|---|---|---|
| 3,966,642 | 6/1976 | Black et al. | 208/111 |
| 4,138,326 | 2/1979 | Swift et al. | 208/108 |
| 5,208,385 | 5/1993 | Kahn et al. | 560/240 |
| 5,344,964 | 9/1994 | Chu et al. | 560/240 |
| 5,466,778 | 11/1995 | Lambert et al. | 528/361 |

FOREIGN PATENT DOCUMENTS 3606479  9/1987  Germany.

OTHER PUBLICATIONS

Chem. Abs., 108:22504 (1987), Mueller.

*Primary Examiner*—Shean C. Wu
*Attorney, Agent, or Firm*—Oblon, Spivak, McClelland, Maier & Neustadt, P.C.

[57] ABSTRACT

A method for producing a polyoxyalkylene glycol by ring opening polymerization of a cyclic ether, wherein a zeolite (other than ZSM-5, ZSM-11 and Nu-5) is used as a catalyst.

21 Claims, 7 Drawing Sheets

METHOD FOR PRODUCING A POLYOXYALKYLENE GLYCOL AND NOVEL METALLO-ALUMINOSILICATE

BACKGROUND OF THE INVENTION

1. Field of the Invention

The present invention relates to a method for producing a polyoxyalkylene glycol by subjecting a cyclic ether to ring opening polymerization in the presence of a zeolite as a catalyst. Particularly, it relates to a method for producing polytetramethylene ether glycol from tetrahydrofuran. More particularly, it relates to a method for producing polytetramethylene ether glycol having a narrow molecular weight distribution.

Another object of the present invention is to provide metallo-aluminosilicates having a novel structure which is useful as a catalyst for ring opening polymerization of a cyclic ether.

2. Discussion of Background

Polytetramethylene ether glycol (hereinafter referred to simply as "PTMG") is a straight chain polyether glycol having primary hydroxyl groups at both terminals, which is represented by a general formula HO-[(CH$_2$)$_4$O]$_n$—H, and it is a moderate molecular weight polymer useful as a starting material for polyurethane elastic fibers for which stretchability and resilience are required. Recently, it is useful also as a starting material for thermoplastic elastomers. For a starting material for such elastic fibers or elastomers, it is common to employ PTMG having a number average molecular weight (Mn) of from about 500 to 3,000. Accordingly, PTMG having a molecular weight within this range is produced in large amount.

There are known some methods which are conventional for producing PTMG. Namely, (1) a method wherein tetrahydrofuran (hereinafter referred to simply as "THF") is polymerized using as a catalyst a protonic acid belonging to a super strong acid, such as fluorosulfonic acid or fuming sulfuric acid, to obtain a polymer with both terminals being esterified with the protonic acid, and then the terminals are converted to hydroxyl groups by hydrolysis, to obtain a PTMG, (2) a method wherein THF is polymerized using as a catalyst a mixture of an acid and acetic anhydride, such as a mixture of perchloric acid and acetic anhydride or a mixture of a super strong acid containing a fluorine atom and acetic anhydride, to obtain a polymer with both terminals being esterified with acetic anhydride and then the ester groups at both terminals are hydrolyzed with an alkali to convert the terminals to hydroxyl groups, to obtain PTMG, (3) a method wherein THF is polymerized in the presence of a carboxylic anhydride using as a catalyst a perfluorosulfonic acid resin made by copolymerization of e.g. tetrafluoroethylene or chlorotrifluoroethylene with a perfluoroalkylvinyl ether containing a sulfonic acid group precursor (a sulfonic acid group-forming group), to obtain a polymer with both terminals being esterified, and then the ester groups at both terminals of the polymer are subjected to alcoholysis in the presence of a catalyst such as calcium oxide in a basic medium, to convert the terminals to hydroxyl groups, to obtain PTMG, (4) a method wherein THF is polymerized using activated clay as a catalyst to obtain PTMG, (5) a method wherein THF is polymerized using as a catalyst a super strong acid prepared by treating zirconia with sulfuric acid to obtain PTMG, and (6) a method wherein THF is polymerized using as a catalyst a heteropolyacid wherein the content of water of crystallization is controlled within a specific range, to obtain PTMG.

However, in the methods (1) and (2), large amounts of the catalyst are required, and the catalyst is decomposed in the hydrolysis step and can not be reused. Further, a large amount of a waste water is formed in the hydrolysis step, and the pollutant must be removed from the water before the water is discharged to a sewer. Furthermore, the catalyst used here is highly corrosive, and an expensive material has to be used for the construction of the apparatus. In the method (3), a very expensive resin is used as the catalyst, such being economically disadvantageous. In the method (4), the activated clay, which is obtained by acid treatment of montmorillonite which is a natural ore of smectites-type, is basically a natural product, and its composition and the amount of impurities are not constant, whereby there has been a problem that the performance is not consistent. In the method (5), the catalyst to be used, is prepared by e.g. a method which comprises impregnating concentrated sulfuric acid to zirconia, followed by evaporation to dryness and then by calcination to support sulfate groups on zirconia. However, the preparation is difficult and dangerous. Further in the presence of water, sulfate groups contained in the catalyst are lost as sulfuric acid, whereby there has been a problem that the catalytic activities tend to deteriorate. In the method (6), a large amount of heteropolyacid is required as the catalyst, and it is required to strictly control the content of water of crystallization in the acid. Further, the catalytic solution comprising heteropolyacid, THF and water, and another solution comprising PTMG, and unreacted THF must be separated by decantation after the polymerization reaction. Thus, this method is inferior in the operation efficiency and the economical aspect, as compared with a case where a solid catalyst is used, wherein the catalyst can easily be separated by filtration from the resulted polymerization reaction mixture.

SUMMARY OF THE INVENTION

The present invention relates to a method for producing a polyoxyalkylene glycol by ring opening polymerization of a cyclic ether, particularly to a method for producing PTMG, wherein the process for producing PTMG by ring opening polymerization of THF can be carried out by a simple operation, and the catalyst can easily be separated from the polymerization reaction mixture and reused. Further, it is an object of the present invention to provide a method for producing PTMG, wherein the molecular weight distribution of the resulting PTMG can easily be controlled and to provide a novel metallo-aluminosilicate suitable for use as a catalyst for such a reaction.

The present invention provides a method for producing a polyoxyalkylene glycol by ring opening polymerization of a cyclic ether, wherein a zeolite (other than ZSM-5, ZSM-11 and Nu-5) is used as a catalyst.

DETAILED DESCRIPTION OF THE PREFERRED EMBODIMENTS

Figure 1:
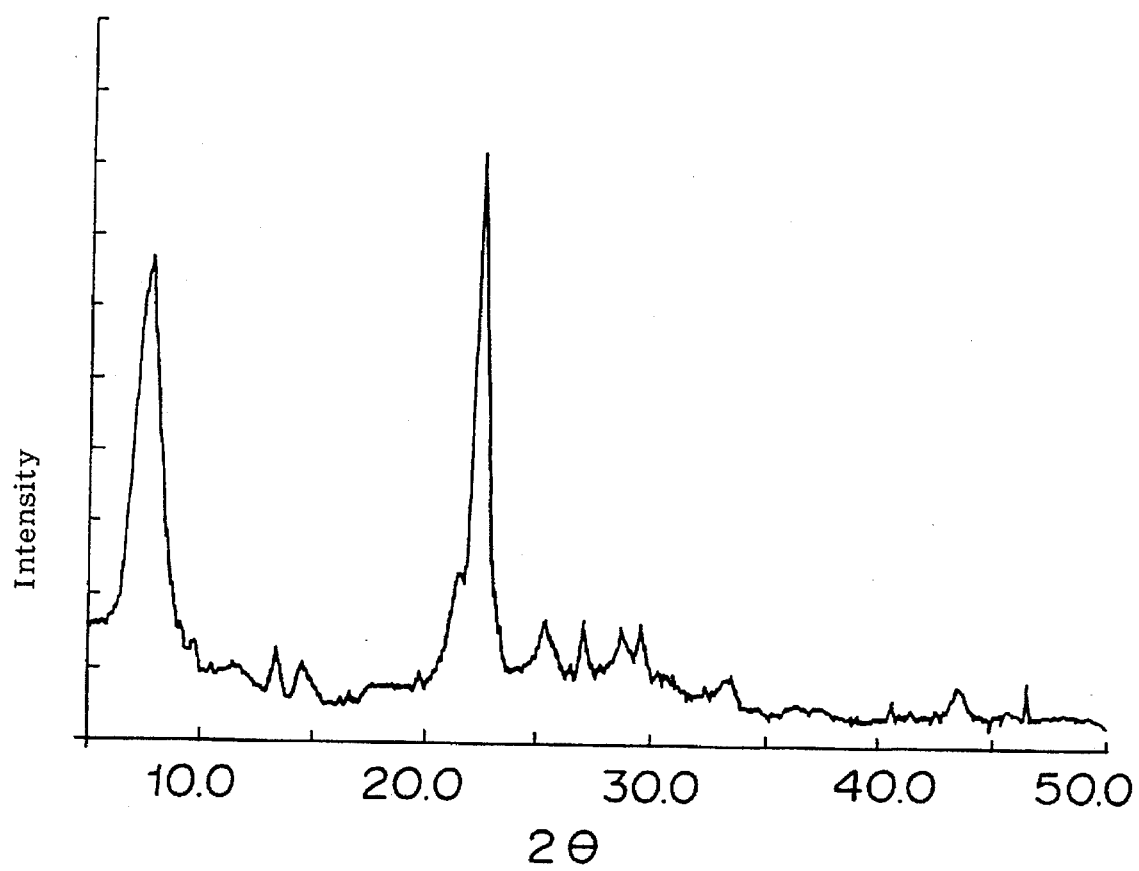
FIG. 1 is a powder X-ray diffraction pattern of zeolite β (H form)(as a reference).

Now, the present invention will be described in detail.

In the present invention, the cyclic ether may be the one having from 2 to 10 carbon atoms which constitute the ring. Specifically, THF, ethylene oxide, propylene oxide, oxetane, tetrahydropyrane, oxepane or 1,4-dioxane may be employed. Further, a cyclic ether substituted by an alkyl group or a halogen atom, such as 2-methyltetrahydrofuran, may also be used. Among them, particularly preferred is THF.

As the catalyst for the ring opening polymerization, a zeolite other than ZSM-5, ZSM-11 and Nu-5, is employed.

In the present invention, the zeolite is meant for a zeolite in a broad sense, and it includes not only a common aluminosilicate, but also aluminophosphate, silicalite and a metallo-silicate containing no aluminum. It may be a natural zeolite or a synthetic zeolite.

The composition of a zeolite is usually expressed by the following general formula:

$M_{2/a}O: xAl_2O_3: ySiO_2: zT_bO_c: kH_2O$ wherein M is at least one cation having a valence of a, T is at least one member selected from the group consisting of chromium, gallium, boron, titanium, iron, lead, tin, copper, indium, cobalt, nickel, zinc, vanadium, molybdenum, arsenic, antimony, manganese, germanium, silver, lanthanum, cadmium, magnesium, cerium and phosphorus, and each of x, y, z, a, b, c and k is an integer inclusive of 0. The zeolite has a three dimensional crystalline structure. Aluminosilicate as the most typical zeolite has a rigid three dimensional network structure comprising $SiO_4$ tetrahedrons and $AlO_4$ tetrahedrons. In the structure, these tetrahedrons are mutually bonded with oxygen atoms, whereby the ratio of the total number of aluminum and silicon atoms to the number of oxygen atoms is 1:2.

The zeolite contains cations (M) in the interior of the tetrahedrons in its structure, whereby electrical equilibrium is maintained. Such cations (M) are usually hydrogen ions, ammonium ions or metal cations of e.g. an alkali metal, an alkaline earth metal, chromium, gallium, boron, iron, lead, tin, copper, indium, cobalt, nickel, zinc, vanadium, molybdenum, arsenic, antimony, manganese, germanium, silver, lanthanum, cadmium, cerium and phosphorus, and they are mutually exchangable.

Further, a zeolite of a structure having a part of aluminum and/or silicon in the zeolite structure substituted by iron, chromium or other metals i.e. a structure of the above formula wherein z is other than 0, may be referred to as a metallo-aluminosilicate, as particularly distinguished.

Among such metallo-aluminosilicates, those having a skeletal structure of zeolite β, wherein the metal species (T) is at least one member selected from the group consisting of chromium, boron, lead, tin, copper, indium, cobalt, nickel, zinc, vanadium, molybdenum, arsenic, antimony, manganese, germanium, silver, lanthanum, cadmium, magnesium, cerium and phosphorus, are not disclosed in any literature, and they are believed to be novel. The present invention provides such novel metallo-aluminosilicates. Such novel metallo-aluminosilicates are useful not only as catalysts for the method for producing a polyoxyalkylene glycol according to the present invention, but also useful as catalysts for various other reactions.

Various aluminosilicates are known due to differences in their skeletal structures or crystal structures, and their compositions are generally represented by the above formula wherein x is 0.1 to 2, y is 1 to 300, z is 0 to 1.5 and k is 0 to 40, and usually y/x is 10 to 100. In the present invention, aluminosilicates out of such ranges can be used inclusive of novel metallo-aluminosilicates.

The zeolite to be used as the catalyst for producing a polyoxyalkylene glycol according to the present invention is preferably a zeolite of a structure selected from the group consisting of the following structure type codes as defined in "Atlas of Zeolite Structure Types Third Edition" edited by W. M. Meier and D. H. Olson, 1992:

| ABW | AEI | AEL | AET | AFG | AFI | AFO | AFR | AFS |
|-----|-----|-----|-----|-----|-----|-----|-----|-----|
| AFT | AFY | ANA | APC | APD | AST | ATN | ATO | ATS |
| ATT | ATV | AWW | *BEA | BIK | BOG | BPH | BRE | CAN |
| CAS | CHA | —CHI | —CLO | DAC | DDR | DOH | EAB | EDI |
| EMT | EPI | ERI | EUO | FAU | FER |     |     |     |
| GIS | GME | GOO | HEU | JBW | KFI | LAU | LEV | LIO |
| LOS | LOV | LTA | LTL | LTN | MAZ | MEI | MEP | MER |
| MFS | MON | MOR | MTN | MTT | MTW | NAT | NES | NON |
| OFF | —PAR | PAU | PHI | RHO | —ROG | SGT | SOD | STI |
| THO | TON | VFI | —WEN | YUG |     |     |     |     |

With respect to ZSM-5, ZSM-11 and Nu-5 which are zeolites outside the scope of the present invention, ZSM- 5 and Nu-5 are represented by "MFI", and ZSM-11 is represented by "MEL" according to the above structure type codes.

Among the above zeolites, a zeolite of a structure selected from the groups consisting of the following structure codes, is more preferred:

BEA, EMT, ERI, EUO, FAU, HEU, LTA, LTL, MAZ, MOR, MTW, NES, OFF, TON

Still more preferred is a zeolite of a structure selected from the group consisting of BEA, ERI, EUO, FAU, LTL, MAZ, MOR, MTW, and OFF. Most preferred is a zeolite of a BEA structure.

Specific examples of such zeolites include zeolite A (LTA), mordenite (MOR), clinoptilolite (HEU), zeolite L (LTL), ZSM-4 (MAZ, Japanese Unexamined Patent Publication No. 25097/1972), ZSM-12 (MTW, U.S. Pat. No. 3,709,979), ZSM-20 (FAU, U.S. Pat. No. 3,832,449), Nu-10 (TON, Japanese Unexamined Patent Publication No. 200218/1972), Nu-87 (NES), zeolite β (BEA, U.S. Pat. No. 3,308, 069), zeolite X (FAU, U.S. Pat. No. 288,244), zeolite Y (FAU, U.S. Pat. No. 3,130,007), ultra stable Y (FAU), hexagonal faujasite (EMT, U.S. Pat. No. 5,098,686), SAPO-5 (AFI, Pure and Applied Chem. 58, 1351 (1986)), SAPO-11 (AEL, Pure and Applied Chem, 58, 1351(1986)), SAPO-20 (SOD, J. Am. Chem. Soc., 104 1146 (1982)), SAPO-34 (CHA, J. Am. Chem. Soc., 106 6092 (1984)), SAPO-35 (LEV, J. Am. Chem. Soc., 106 6092 (1984)), SAPO-37 (FAU, J. Am. Chem. Soc., 106 6092 (1984)), SAPO-40 (AFR), SAPO-42 (LTA, J. Am. Chem. Soc., 106 6092 (1984)), EU-1(EUO, EP 42226A), offretite (OFF, U.S. Pat. No. 4, 503, 023), erionite (ERI, U.S. Pat. No. 4,503, 023), and zeolite omega (MAZ, Cryst. Struct. Comm., 3,399 (1974)). The three alphabets in each bracket represents a structure according to the above structure type codes. Further, a zeolite selected from the group consisting of MCM-22 (U.S. Pat. 4,992,606), ZSM-21 (Japanese Unexamined Patent publication No. 41658/1978), NU-3 (Japanese Unexamined Patent Publication No. 3714/1982), NU-6 (Japanese Unexamined Patent Publication No. 123817/1982), NU-85, PSH-3 (Japanese Examined Patent Publication NO. 10761/1990) and MCM-41 (U.S. Pat. No. 5,098,684), structures of which are not known, and can not be represented by the above structure type codes, can also preferably be employed for the method of the present invention.

For the method of the present invention, preferred among the above described zeolites is a zeolite selected from the group consisting of zeolites β, mordenite, zeolite L, offretite, erionite, zeolite omega and ultra stable Y, as well as EU-1, ZSM-12 and MCM-22. More preferred is a zeolite selected from the group consisting of zeolite β, zeolite omega, ultra stable Y, offretite and erionite, as well as EU-1, ZSM-12 and MCM-22. Still more preferred is zeolite β or ultra stable Y, and most preferred is zeolite β.

Here, zeolite β is a zeolite synthesized by the method disclosed, for example, in U.S. Pat. No. 3,308,069.

In this specification, zeolite β means a zeolite having, at least as a part of its structure, any one of Polymorph A and Polymorph B (J. M. Newsam et al. Proc. R. Soc. London, A420, 375 (1988)) and Polytype A, Polytype B and Polytype C (J. B. Higgins et al. Zeolites 8, 446 (1988)). According to the above mentioned structure type codes, zeolite β represented by BEA is Polymorph A or Polytype A. Therefore, zeolite β of the present invention also includes zeolites β of structures other than BEA.

In the present invention, a metallo-aluminosilicate having a skeletal structure of zeolite β is also preferably employed. Such a metallo-aluminosilicate can be produced, for example, in accordance with the method disclosed in U.S. Pat. No. 3,308,069. Namely, a metal to be isomorphously substituted for aluminum or silicon in zeolite skeletal structure is incorporated in the form of an inorganic acid salt such as a nitrate or a sulfate, or an organic acid salt such as an acetate, to the starting material for the preparation of zeolite β in a suitable amount to constitute a desired composition, followed by hydrothermal synthesis to obtain the desired metallo-aluminosilicate having a zeolite β skeletal structure.

In the method for producing a polyoxyalkylene glycol according to the present invention, preferably employed as a catalyst are the zeolite β and a metallo-aluminosilicate having a skeletal structure of zeolite β, wherein the metal species (T) is at least one member selected from the group consisting of chromium, gallium, boron, titanium, iron, lead, tin, copper, indium, cobalt, nickel and zinc. More preferred is the one wherein the metal species (T) is at least one member selected from the group consisting of chromium, boron, titanium, lead, tin, copper, indium, cobalt, nickel and zinc.

Before use, the zeolite is converted to a H-form (proton-form) (in the above formula, M=H) by conventional ion exchange and calcination. The zeolite is preferably used in dry state, to say containing no substantial water, in the polymerization reaction.

The zeolite thus obtained may usually be used to the reaction as it is. However, it may be modified by a fluorinating agent such as ammonium fluoride or fluorine gas and then used for the reaction. Such fluorination is conducted usually at a temperature of from room temperature to 1300° C., preferably from 50° to 800° C. By the fluorination of the catalyst, the molecular weight distribution of the resulting PTMG tends to be narrow, such being desirable.

The zeolite may be heated and calcined in a gas atmosphere, for example, in air, in an inert gas such as nitrogen, helium or argon, or in hydrogen gas, to change the solid acidity of the zeolite. This is explained by e.g. a phenomenon such that, for example, aluminum is withdrawn from the lattice by the self-protonic acidity of the H-form zeolite, whereby Brønstead acid sites will decrease, and Lewis acid sites will increase. The heating and calcining temperature is usually from 200 to 1300° C., preferably from 400° to 1150° C. Such heating and calcining treatment may be carried out in the polymerization reactor. However, it is preferred to carry out the treatment of the zeolite before it being charged into the reactor. Steam may be incorporated in such a gas atmosphere. For example, the above mentioned gas is passed through water saturated with steam at that temperature or steam is generated and introduced in the gas.

In the method of the present invention, the zeolite catalyst may be used in a powder form. Otherwise, it may be used in the forms of granules, pellets or spheres having a particle size of from 0.1 to 5 mm, which are prepared by mixing a binder such as boehmite, zirconia, alumina, kaolin or silica usually in an amount of from 5 to 50 wt %, preferably from 10 to 30 wt %, to the zeolite and molding the mixture. The specific surface area of the catalyst is usually within a range of from 100 to 800 mm²/g. The catalytic activity of the zeolite decreases gradually in the course of polymerization reaction, but it can be regenerated by oxidation treatment with an oxygen-containing gas or by hydrogenation treatment with a hydrogen-containing gas.

The ring opening polymerization reaction is conducted in a liquid phase in an inert gas atmosphere such as nitrogen or argon, or hydrogen gas. If oxygen is present in the atmosphere, a peroxide derived from the cyclic ether is likely to be formed. Therefore, it is preferred to carry out the reaction in a non-oxydizing atmosphere while maintaining the oxygen concentration at a lower level.

Various types of reactors such as a suspended bed reactor, a fixed bed reactor, or a trickle bed reactor may be employed. An aliphatic hydrocarbon, an aromatic hydrocarbon, an alicyclic hydrocarbon or a hydrocarbon containing a heteroatom such as nitrogen, sulfur or oxygen, which is inert to the ring-opening polymerization, may be employed as a solvent. When the polymerization reaction is conducted batchwise in a suspended bed reactor, the zeolite catalyst can easily be separated from the polymerization product and can be returned to the reactor for reuse.

The zeolite may be used without any additive. However, it is advantageous to use it in combination with an acid anhydride. Particularly when THF is used as the cyclic ether, it is thereby possible to easily control the number average molecular weight of the resulting PTMG to a narrow molecular weight distribution within a medium molecular weight range of e.g. from 200 to 3,000. As such as acid anhydride, it is preferred to employ a carboxylic anhydride, particularly acetic anhydride. Such an acid anhydride is incorporated usually within a range of from 0.01 to 0.5 mol per mol of THF. When such an acid anhydride is used, the resulting polymer will be a diester of polyoxyalkylene glycol with such an acid. Accordingly, the product is treated by a conventional method such as hydrolysis or alcoholysis to convert the ester groups to hydroxyl groups.

Further, a polar solvent may be added to the reactor to prevent excessive polymerization and thereby to control the molecular weight distribution. Specifically, water, an alcohol such as methanol, ethanol, isopropanol, ethylene glycol or 1,4-buthandiol, or an amide such as formamide, dimethylformamide or dimethylacetoamide, may, for example, be used. Such a polar solvent is used usually in an amount within a range of from $10^{-4}$ to 0.5 mol per mol of THF.

The above mentioned acid anhydride and the polar solvent may be used in combination.

Now, with respect to specific conditions for the polymerization reaction, the reaction temperature is usually from 0 to 200° C., preferably from 10° to 80° C. The reaction pressure may be at any level so long as the starting material can be maintained in a liquid phase. It is usually within a pressure range of from atmospheric pressure to 100 kg/cm² G, preferably from atmospheric pressure to 50 kg/cm² G. The amount of the catalyst is varied in a wide range if desired. However, if the amount of the catalyst is too little, the polymerization rate tends to be low. On the other hand, if it is too much, it tends to be difficult to remove the polymerization heat. Further, the concentration of the slurry comprising the starting material and the catalyst tends to be high, whereby stirring of the slurry tends to be difficult, and there will be an additional problem such that the catalyst can hardly be separated from the resulted reaction mixture after completion of the polymerization. Therefore, the ratio of the catalyst to the liquid phase is usually within a range of from 0.001 to 50 times by weight, preferably from 0.01 to 20 times by weight, taking into consideration of the batchwise reaction or continuous reaction. In the case of the continuous reaction, the above ratio represents that of the catalyst in the reactor to the liquid phase hourly supplied to the reactor.

The reaction time may vary widely, depending upon the ratio of the catalyst to the liquid phase and the reaction temperature.

The reaction may be conducted in various ways, for example, in a batchwise reaction with suspended bed, or in a continuous reaction with suspended bed or fixed bed. The particle size of the catalyst is usually from 20 to 10,000 μm, preferably from 100 to 5,000 μm, more preferably from 250 to 3,000 μm. Taking the yield and efficiency into consideration, the reaction time in batchwise reaction is usually within a range of from 0.1 to 20 hours, preferably from 0.5 to 15 hours. In continuous reaction using fixed bed, the retention time in the reactor is usually from 0.01 to 10 hours, preferably from 0.1 to 5 hours.

When THF is polymerized in accordance with the present invention, it is possible to easily obtain PTMG having a number average molecular weight of from 200 to 80,000, particularly from 200 to 40,000. When the above mentioned polar solvent is incorporated to the reactor, it is possible to easily obtain PTMG having a number average molecular weight of from 200 to 40,000, particularly from 500 to 40,000. Likewise, when the acid anhydride is incorporated, it is possible to easily obtain PTMG having a low molecular weight at a level of a number average molecular weight of from 200 to 40,000, particularly from 200 to 3,000, more particularly from 700 to 2,000.

One of the features of the present invention is that PTMG having a narrow molecular weight distribution (Mw/Mn) can easily be produced. According to the present invention, it is easy to produce PTMG wherein the molecular weight distribution (Mw/Mn) is less than 20, for example from 1.0 to 10.0. There is much demand for PTMG having a narrow molecular weight distribution. According to the present invention, it is possible to easily produce PTMG wherein Mw/Mn is from 1.0 to 4.0, more narrowly from 1.1 to 3.0. If desired, it is also possible to obtain PTMG having a very narrow molecular weight distribution at a level Mw/Mn being from 1.1 to 2.0. Thus, according to the present invention, it is possible to produce PTMG having a relatively low molecular weight and a very narrow molecular weight distribution such that the number average molecular weight is from 500 to 3,000, particularly from 700 to 2,000, and Mw/Mn is from 1.0 to 4.0, particularly from 1.1to 3.0.

On the other hand, if ZSM-5, ZSM-11 or Nu-5 is used as a catalyst, the molecular weight distribution (Mw/Mn) of the PTMG produced will be more than 20. Further, if such ZSM-5, ZSM-11 or Nu-5 is used as a catalyst, PTMG having such a high weight average molecular weight as 90,000 is produced, and such high molecular weight PTMG is of a poor value.

Now, the present invention will be described in further detail with reference to Examples. However it should be understood that the present invention is by no means restricted to such specific Examples. In the following Examples, $SiO_2/Al_2O_3$, the reaction time, the yield(ø), Mn, Mw, the equilibrium yield (øe), have the following meanings.

$SiO_2/Al_2O_3$: Molar ratio

Reaction time (batchwise reaction):
  The time when the reactor charged with slurry comprising THF and zeolite was immersed in a water bath set at a predetermined reaction temperature, is taken as the initiation of the reaction.

Reaction time (continuous reaction):
  The time when the reaction solution started flowing out of the outlet of a jacketed reactor containing fixed zeolite bed after supplying a THF solution to the jacketed reactor set at a predetermined reaction temperature, is taken as the initiation of the reaction.

Yield (ø): Weight % of PTMG or PTMG acetate relative to the supplied THF.

Mn: Number average molecular weight measured by gel permeation chromatography.

Mw: Weight average molecular weight measured by gel permeation chromatography.

Equilibrium yield (øe): Equilibrium yield of PTMG or PTMG acetate at the temperature (calculated based on FIG. 3.11 at page 171 of "Ring Opening Polymerization (1), Polymerization Reaction Theory 6", published by Kagaku Doujin, edited by Takeo Saegusa, first edition issued on May 10, 1971).

The catalysts used for the reaction were prepared as follows.

Catalysts

C-1-1: Zeolite β (product of PQ Corporation; $SiO_2/Al_2O_3=25$; H form) was calcined at 400° C. for 2 hours in a nitrogen stream.

C-1-2: The above zeolite β was calcined at 400° C. for 3 hours in a nitrogen stream.

C-1-3: The above zeolite β was calcined at 560° C. for 3 hours in a nitrogen stream.

C-1-4: The above zeolite β was calcined at 650° C. for 3 hours in a nitrogen stream.

C-1-5: The above zeolite β was calcined at 750° C. for 3 hours in a nitrogen stream.

C-1-6: The above zeolite β was calcined at 850° C. for 3 hours in a nitrogen stream.

C-1-7: The above zeolite β was calcined at 950° C. for 3 hours in a nitrogen stream.

C-1-8: The above zeolite β was calcined at 1000° C. for 3 hours in a nitrogen stream.

C-1-9: The above zeolite β was calcined at 380° C. for 3 hours in an air stream.

C-1-10: The above zeolite β was calcined at 740° C. for 3 hours in an air stream.

C-1-11: The above zeolite β was calcined at 950° C. for 3 hours in an air stream.

C-1-12: The above zeolite β was calcined at 760° C. for 3 hours in a nitrogen stream saturated with steam at 20° C.

C-1-13: The above zeolite β was calcined at 840° C. for 3 hours in a nitrogen stream saturated with steam at 20° C.

C-1-14: The above zeolite β was calcined at 900° C. for 3 hours in a nitrogen stream saturated with steam at 20° C.

C-1-15: 5 g of zeolite β (product of PQ Corporation $SiO_2$/$Al_2O_3$=25; H form), 0.52 g of ammonium fluoride (product of Wako Junyaku K.K.; guaranteed reagent) and 10.6 g of deionized water were charged into a 100 ml container made of teflon, a lid was put on the container, and the mixture was left to stand still at 90° C. for 24 hours, followed by filtration. The product was washed with 200 ml of deionized water, then subjected to filtration again and dried at 110° C. for 24 hours. After cooling to room temperature, the product was heated to 540° C. over a period of two hours in a nitrogen stream and calcined at that temperature for 5 hours. The obtained catalyst is considered to contain about 5 wt % of fluorine.

C-1-16: This catalyst was prepared in the same manner as the preparation of the C-1-15 catalyst except that the amount of ammonium fluoride was changed to 1.08 g. The obtained catalyst is considered to contain about 10 wt % of fluorine.

C-1-17: This catalyst was prepared in the same manner as the preparation of the C-1-15 catalyst except that the amount of ammonium fluoride was changed to 2.44 g. The obtained catalyst is considered to contain about 20 wt % of fluorine.

C-2-1: 6.95 g of $NaAlO_2$ (product of Wako Junyaku K.K.; Al/NaOH=0.54), 6.14 g of $Cr(NO_3)_3 \cdot 9H_2O$ (product of Kishida Kagaku K. K.) and 120.0 g of deionized water were charged into a 300 ml plastic beaker and stirred for 20 minutes. Then, 61.1 g of a 40% aqueous solution of tetraethylammonium hydroxide (TEA.OH)(product of Aldorich Company) was added to this solution, and the mixture was stirred for 10 minutes.

47.37 g of white carbon (product of Tokuyama soda Co., Ltd.; fine silica powder; trade name: TOKUSIL-U) was put into a 1 l wide-mouthed plastic bottle, and the above prepared solution was added thereto. Further, 63.0 g of deionized water was added thereto, and the mixture was stirred and homogenized at 6,000 rpm for 10 minutes by a homogenizer. The composition of the precursor thus obtained was as follows, $SiO_2$/$Al_2O_3$=26, $OH^-$/$SiO_2$=0.28, $H_2O$/$SiO_2$=15.4, Na/$SiO_2$=0.14, TEA/$SiO_2$=0.21, $SiO_2$/$Cr_2O_3$=104.8, and Si:Cr (atomic ratio)=52.4:1. This precursor was put into a container made of teflon, and the container was put into a 1 l SUS-316 autoclave. The autoclave was flushed with nitrogen, and hydrothermal synthesis was initiated with stirring at 180 rpm.

Figure 2:
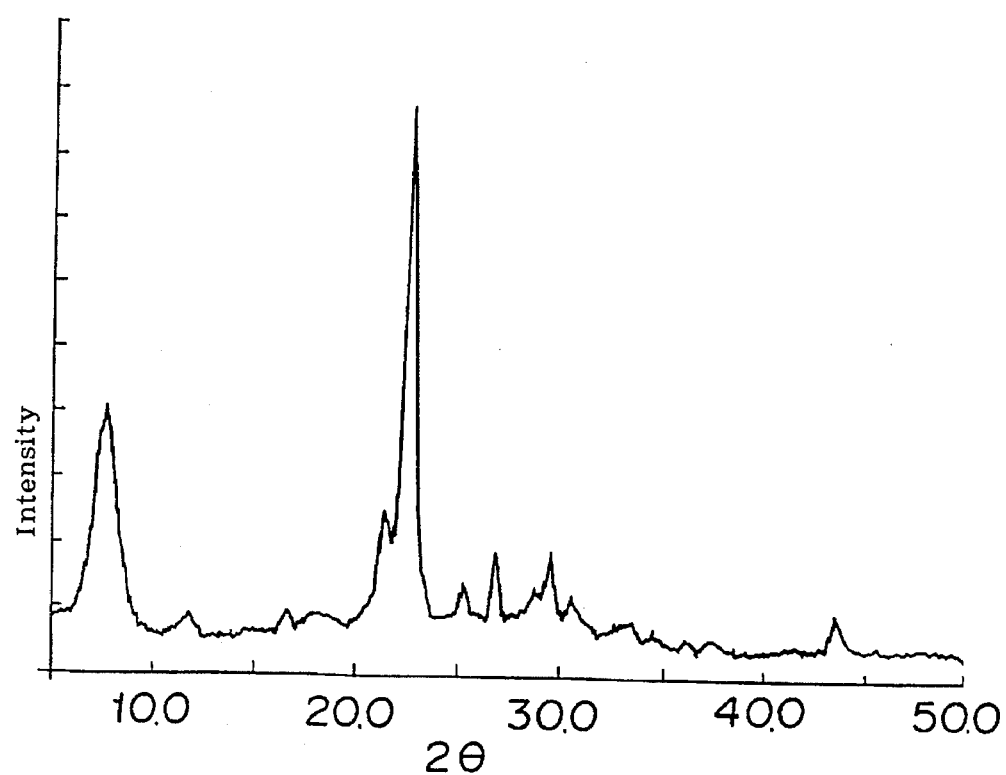
FIG. 2 is a powder X-ray diffraction pattern of zeolite of C-2-1 (chromo β).

The temperature was raised from room temperature to 160° C. over a period of 6 hours (the temperature raising rate: 0.4° C./min) and maintained at 160° C. for 90 hours. Then, the content was subjected to filtration, washed with deionized water and then dried at 120° C. for one day. The dried product was 42.3 g and was a green powder. This powder was analyzed by powder X-ray diffraction under the following conditions, and the results showed, as shown in FIG. 2, the same diffraction pattern as the diffraction pattern (FIG. 1) of zeolite β, and no peak attributable to chromium oxide was observed, which indicates that chromo β having chromium taken into the lattice, formed. From the results of the analysis of the composition of the chromo β, $SiO_2$/$Al_2O_3$=29.4, and Si/Cr atomic ratio=97.6.

Measurement conditions for powder X-ray diffraction analysis (XRD)

Cu-Kα rays: 40 kV, 30 mA
Step size: 0,050 deg, 0,050 deg/sec
Measured range: 2θ=5 to 50°
Graphite monochrometer was used.
Divergence slit (d.s.)=1°
Receiving slit (r.s.)=0.2°
Scatter slit (s.s.)=1°

The chromo β prepared as described above, was converted to a H form by a conventional method and then calcined at 400° C. for two hours in a nitrogen stream, to obtain a catalyst.

In each of the following C-2-2 to C-2-11, a zeolite was prepared in the same manner as for C-2-1 except that instead of chromium nitrate, another metal salt was used. The powder X-ray diffraction pattern of the formed zeolite was the same as the diffraction pattern of zeolite β, and no peak attributable to the metal oxide was observed, which indicates that the metal was isomorphously substituted in the lattice. This zeolite was converted to a H form and then calcined at 400° C. for two hours in a nitrogen stream, to obtain a catalyst.

Figure 3:
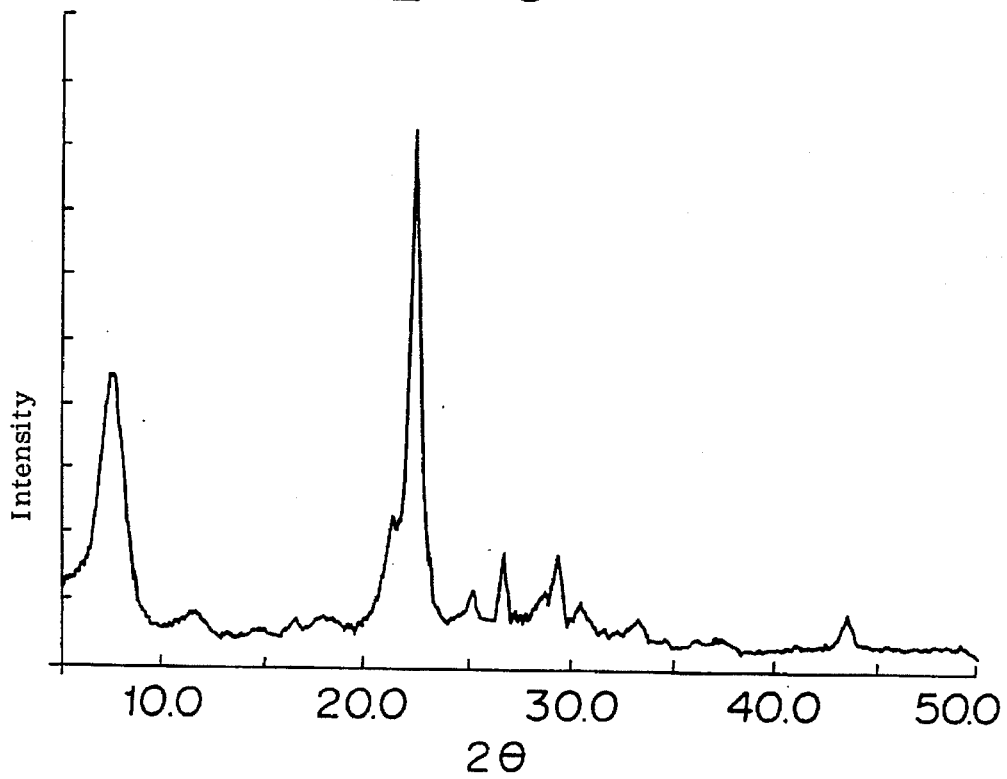
FIG. 3 is a powder X-ray diffraction pattern of zeolite of C-2-2 (zinc β).

C-2-2: Instead of $Cr(NO_3)_3 \cdot 9H_2O$, $Zn(NO_3)_2 \cdot 6H_2O$ (product of Kishida Kagaku K. K.) was employed (Si/Zn (atomic ratio)=49.9). The resulted zeolite had a composition of $SiO_2$/$Al_2O_3$=23.8, and Si/Zn (atomic ratio)=573. The powder X-ray diffraction pattern is shown in FIG. 3.

Figure 4:
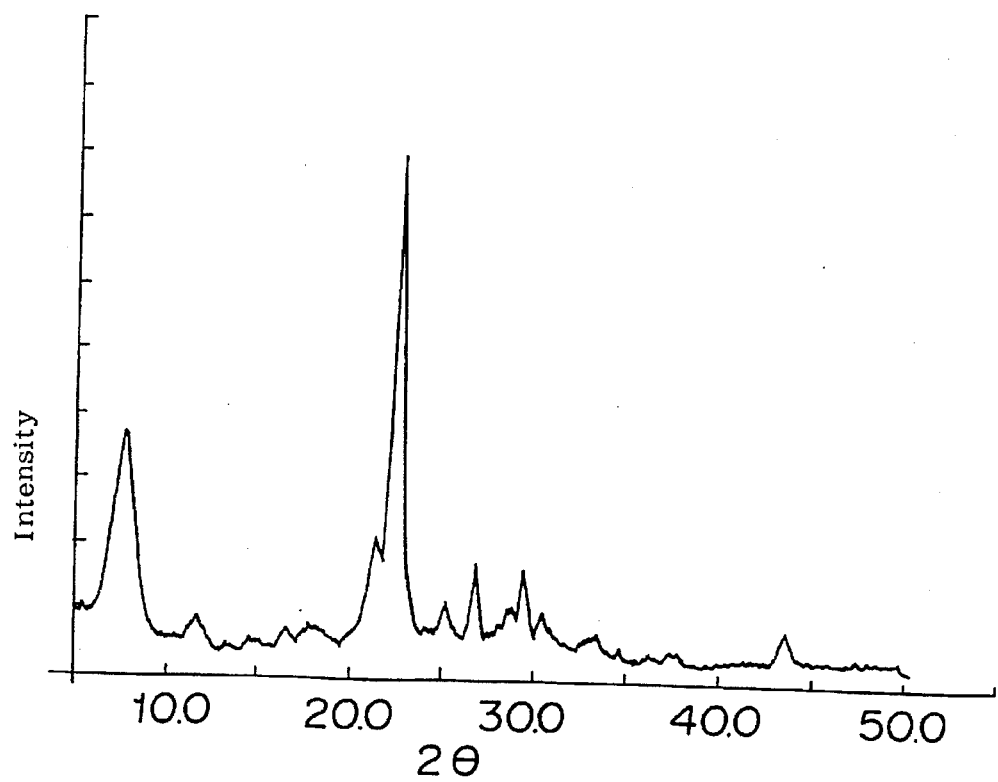
FIG. 4 is a powder X-ray diffraction pattern of zeolite of C-2-3 (iron β).

C-2-3: Instead of $Cr(NO_3)_3 \cdot 9H_2O$, $Fe(NO_3)_3 \cdot 9H_2O$ (product of Kishida Kagaku K. K.) was employed (Si/Fe (atomic ratio)=49.8). The resulted zeolite had a composition of $SiO_2$/$Al_2O_3$=27.7, and Si/Fe (atomic ratio)=46.6. The powder X-ray diffraction pattern is shown in FIG. 4.

Figure 5:
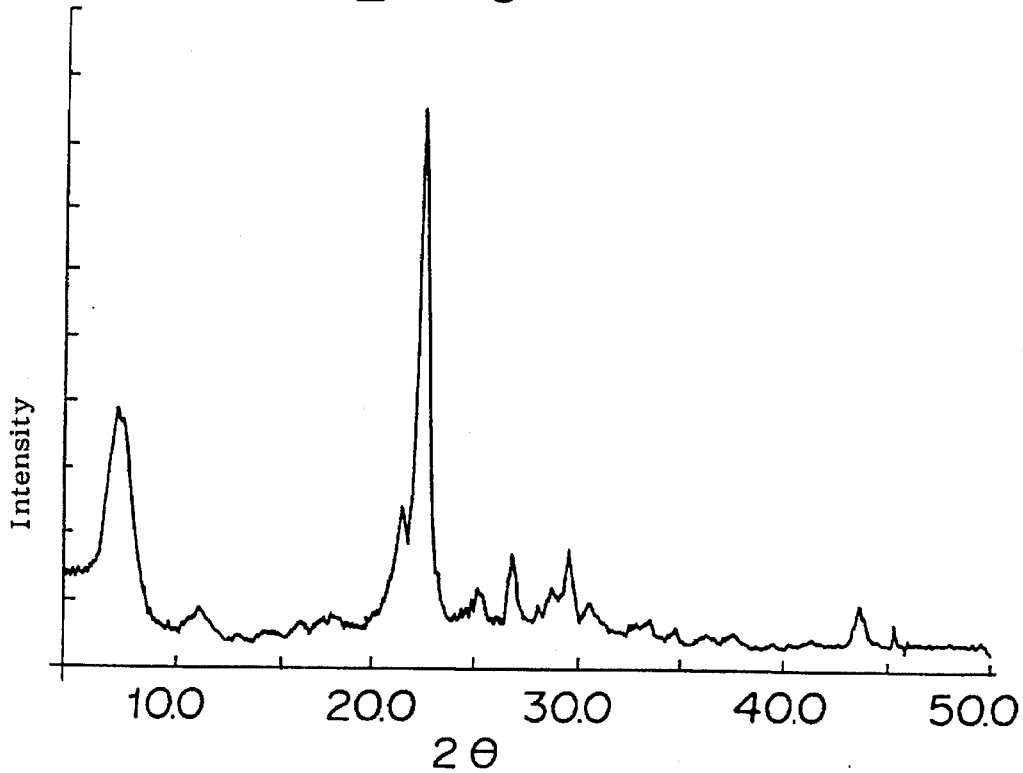
FIG. 5 is a powder X-ray diffraction pattern of zeolite of C-2-4 (cobalt β).

C-2-4: Instead of $Cr(NO_3)_3 \cdot 9H_2O$, $Co(NO_3)_2 \cdot 6H_2O$ (product of Kishida Kagaku K. K.) was employed (Si/Co (atomic ratio)=50.0). The resulted zeolite had a composition of $SiO_2$/$Al_2O_3$=24.4, and Si/Co (atomic ratio)=138. The powder X-ray diffraction pattern is shown in FIG. 5.

Figure 6:
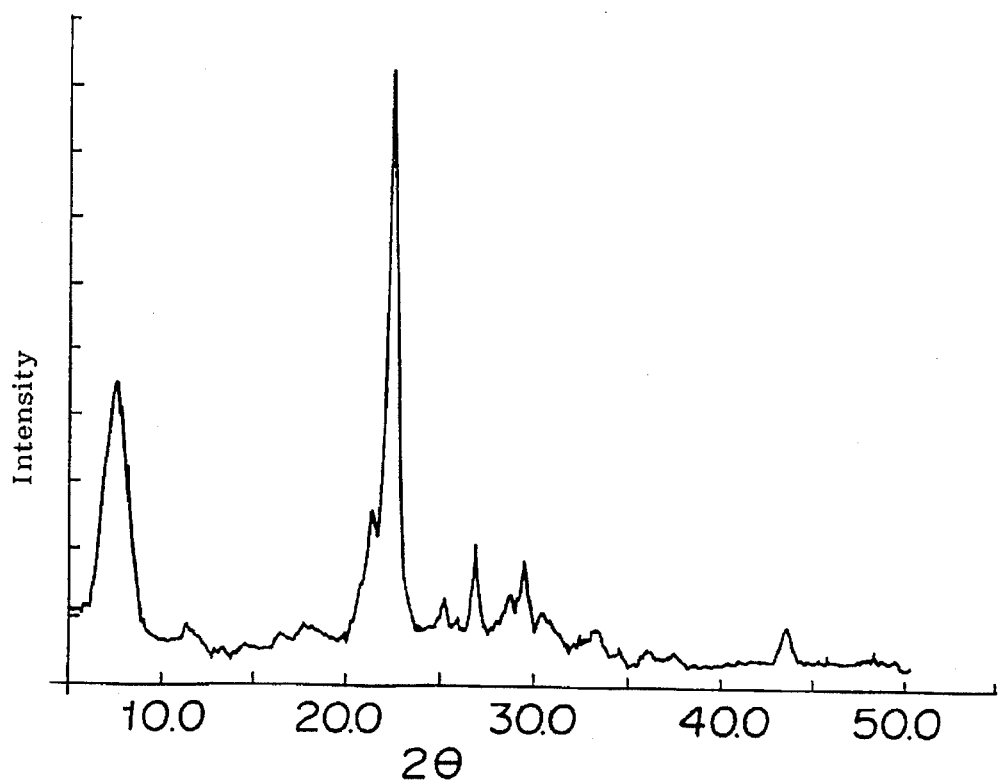
FIG. 6 is a powder X-ray diffraction pattern of zeolite of C-2-5 (gallium β).

C-2-5: Instead of $Cr(NO_3)_3 \cdot 9H_2O$, $Ga(NO_3)_3 \cdot 8H_2O$ (product of Kishida Kagaku K. K.) was employed (Si/Ga (atomic ratio)=50.0). The resulted zeolite had a composition of $SiO_2$/$Al_2O_3$=27.9, and Si/Ga (atomic ratio)= 39.1. The powder X-ray diffraction pattern is shown in FIG. 6.

Figure 7:
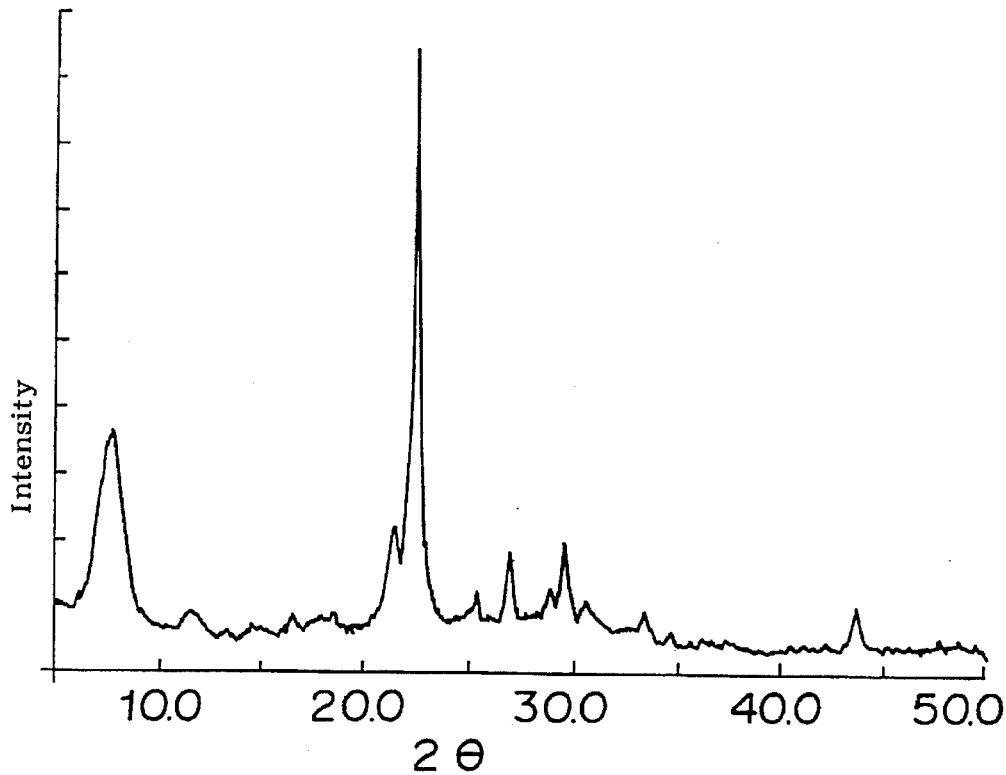
FIG. 7 is a powder X-ray diffraction pattern of zeolite of C-2-6 (tin β).

C-2-6: Instead of $Cr(NO_3)_3 \cdot 9H_2O$, $SnSO_4$ (product of Kanto Kagaku K. K., purity: 93%) was employed (Si/Sn (atomic ratio)=49.3). The resulted zeolite had a composition of $SiO_2$/$Al_2O_3$=25.9, and Si/Sn (atomic ratio)=53.0. The powder X-ray diffraction pattern is shown in FIG. 7.

Figure 8:
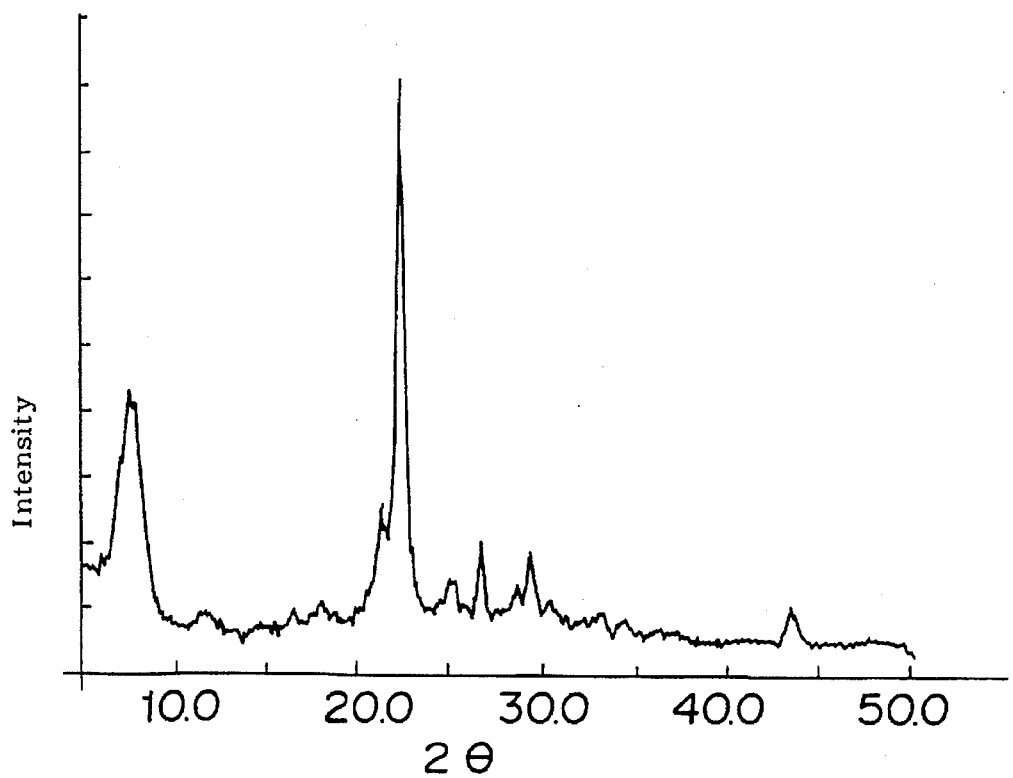
FIG. 8 is a powder X-ray diffraction pattern of zeolite of C-2-7 (nickel β).

C-2-7: Instead of $Cr(NO_3)_3 \cdot 9H_2O$, $NiSO_4 \cdot 6H_2O$ (product of Wako Junyaku K. K.) was employed (Si/Ni (atomic ratio)=49.3). The resulted zeolite had a composition of $SiO_2/Al_2O_3$=25.5, and Si/Ni (atomic ratio)=94.5. The powder X-ray diffraction pattern is shown in FIG. 8.

Figure 9:
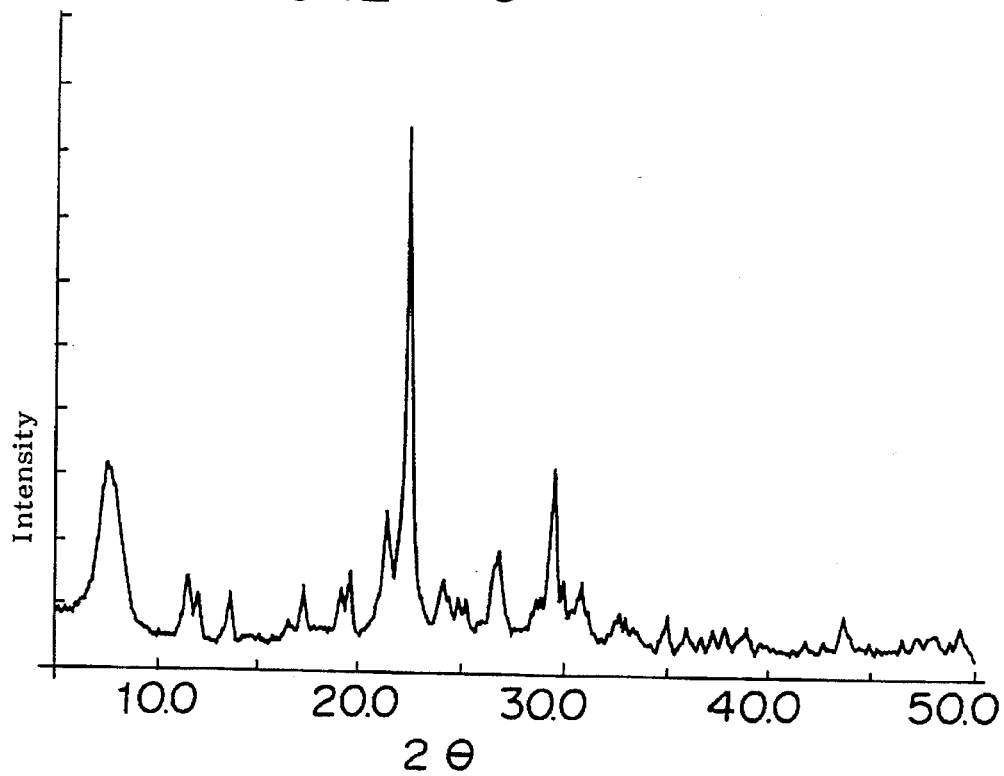
FIG. 9 is a powder X-ray diffraction pattern of zeolite of C-2-8 (lead β).
Figure 10:
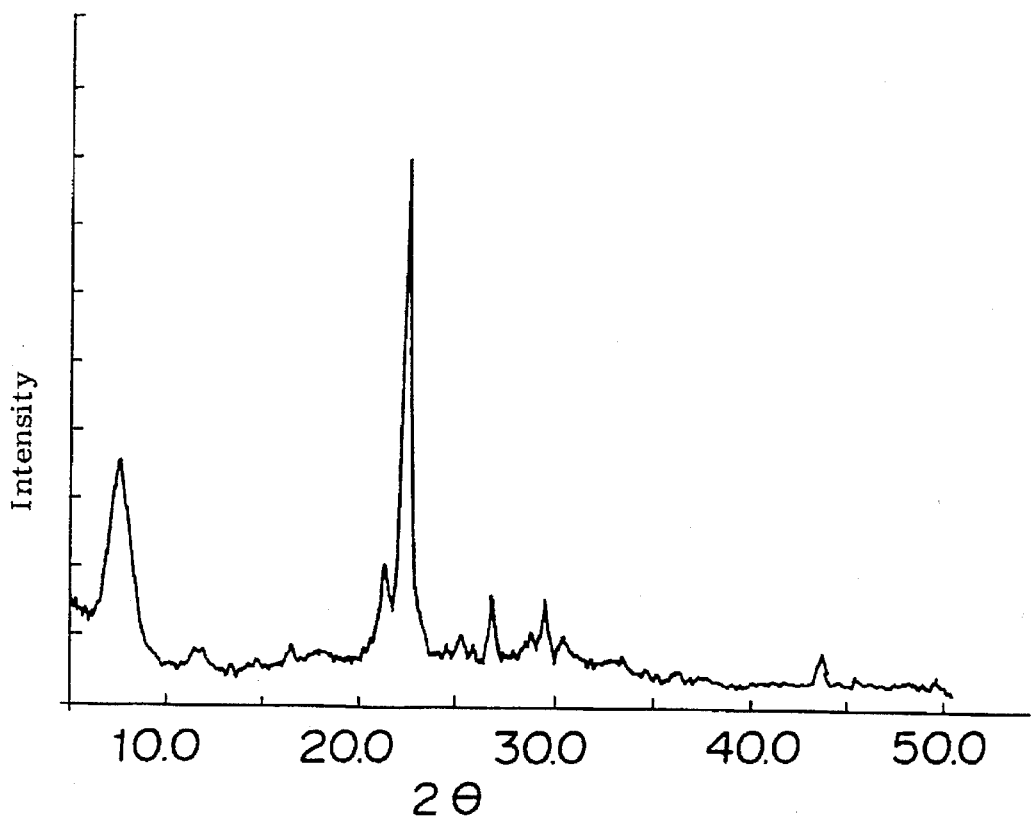
FIG. 10 is a powder X-ray diffraction pattern of zeolite of C-2-9 (indium β).

C-2-8: Instead of $Cr(NO_3)_3 \cdot 9H_2O$, $Pb(NO_3)_2$ (product of Kishida Kagaku K. K.) was employed (Si/Pb (atomic ratio)=49.9). The resulted zeolite had a composition of $SiO_2/Al_2O_3$=26.1, and Si/Pb (atomic ratio)=120.0. The powder X-ray diffraction pattern is shown in FIG. 9.

C-2-9: Instead of $Cr(NO_3)_3 \cdot 9H_2O$, $In(NO_3)_3 \cdot 3H_2O$ (product of Mitsuwa K. K.) was employed (Si/In (atomic ratio)=45). The resulted zeolite had a composition of $SiO_2/Al_2O_3$=30.2, and Si/In (atomic ratio)=45.7. The powder X-ray diffraction pattern is shown in FIG. 9.

Figure 11:
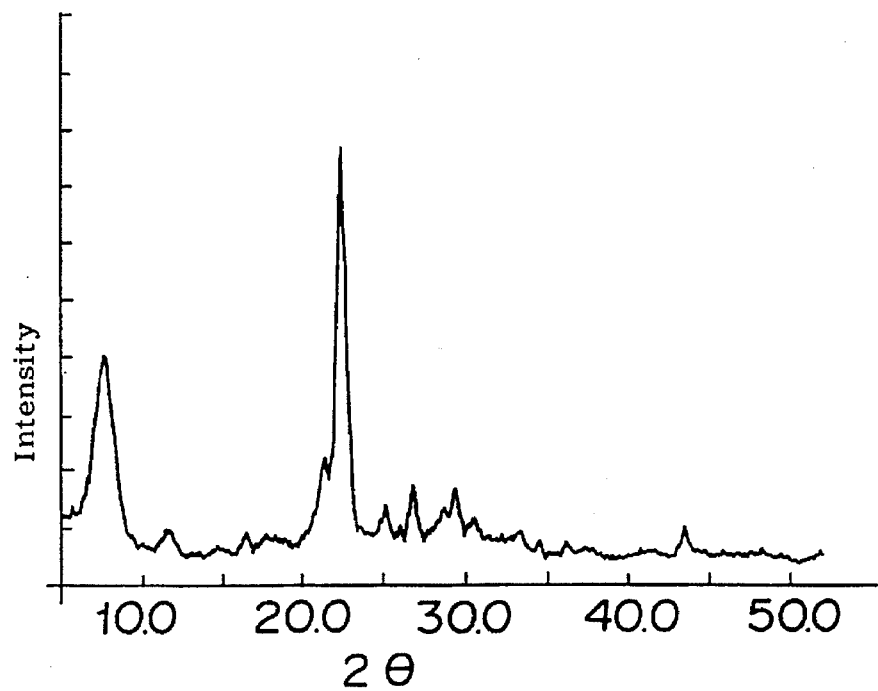
FIG. 11 is a powder X-ray diffraction pattern of zeolite of C-2-10 (copper β).

C-2-10: Instead of $Cr(NO_3)_3 \cdot 9H_2O$, $Cu(NO_3)_2 \cdot 3H_2O$ (product of Wako Junyaku K. K.) was employed (Si/Cu (atomic ratio)=51.0). The resulted zeolite had a composition of $SiO_2/Al_2O_3$=23.0, and Si/Cu (atomic ratio)=1530. The powder X-ray diffraction pattern is shown in FIG. 11.

Figure 12:
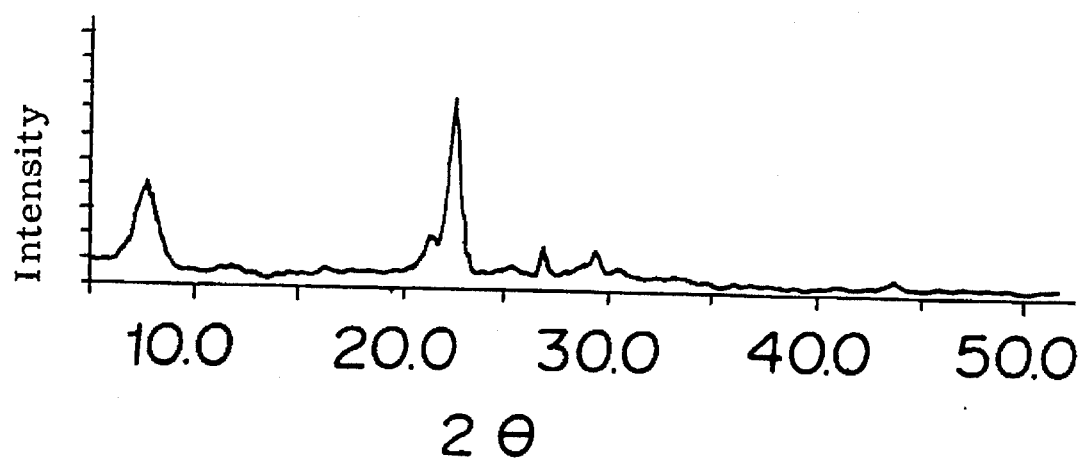
FIG. 12 is a powder X-ray diffraction pattern of zeolite of C-2-11 (boron β).

C-2-11: Instead of $Cr(NO_3)_3 \cdot 9H_2O$, boric acid (product of Wako Junyaku K. K., purity: 99.9%) was employed (Si/B (atomic ratio)=50.0). The resulted zeolite had a composition of $SiO_2/Al_2O_3$=29.5, and Si/B (atomic ratio)=51.2. The powder X-ray diffraction pattern is shown in FIG. 12.

C-2-12: Chromo β was prepared in the same manner as for C-2-1 except that $Cr(NO_3)_3 \cdot 9H_2O$ was used so that Si/Cr (atomic ratio)=25.6. This chromo β had a composition of $SiO_2/Al_2O_3$=31.6, and Si/Cr (atomic ratio)=29.8.

C-3-1: 90 g of zeolite β (product of PQ Corporation; $SiO_2/Al_2O_3$=25; H form) and 60 g of boehmite (trade name: Condea Pural SB) were mixed and kneaded for 10 minutes by a kneader. A solution having 40.2 g of corn starch dissolved in hot water of 80° C., was gradually added thereto, and 30 ml of deionized water was further added thereto. The mixture was kneaded for one hour. The obtained paste was extruded in the form of a string from a hole having a diameter of 2.5 mm. The string was dried at room temperature for 12 hours and then cut into lengths of 5 to 8 mm and calcined at 170° C. in a nitrogen stream. Then, the product was calcined at 650° C. for 20 hours in an air stream diluted with nitrogen. The obtained shaped product was pulverized and sieved to obtain a granule of from 850 to 1700 µm. This granule was further calcined at 400° C. for 3 hours in a nitrogen stream to obtain a catalyst.

C-3-2: A catalyst was prepared in the same manner as for C-3-1 except that the pulverized product of the shaped product was calcined at 960° C. for 3 hours in a nitrogen stream.

C-3-3: A catalyst was prepared in the same manner as for C-3-1 except that the shaped product was pulverized and sieved to obtain a granule of from 450 to 600 µm, which was calcined at 960° C. for 3 hours in a nitrogen stream.

C-3-4: A catalyst was prepared in the same manner as for C-3-1 except that the shaped product was pulverized and sieved to obtain a granule of from 1680 to 2000 µm, which was calcined at 960° C. for 3 hours in a nitrogen stream.

C-3-5: A catalyst was prepared in the same manner as for C-3-1 except that the shaped product was calcined at 960° C. for 3 hours in a dry air stream.

C-4: EU-1 was prepared by hydrothermal synthesis ($SiO_2/Al_2O_3$=27). This zeolite was converted to a H form by a conventional method and then calcined at 400° C. for two hours in a nitrogen stream, to obtain a catalyst.

C-5-1 to C-5-3: Mordenite ($SiO_2/Al_2O_3$ is 10 in C-5-1, 15 in C-5-2, and 20 in C-5-3) were converted to H forms by a conventional method and then calcined at 400° C. for two hours in a nitrogen stream, to obtain catalysts.

C-6-1 to C-6-9: The following various zeolites of Tosoh Corporation were converted to H forms by a conventional method and calcined at 400° C. for two hours in a nitrogen stream, to obtain catalysts. In the cases of C-6-4 to C-6-6, the calcined product obtained in C-6-3 was further pulverized by a Perl mill to obtain catalysts.

C-6-1: Zeolite L, tradename: TSZ-500KOA, $SiO_2/Al_2O_3$=6.2

C-6-2: Offretite/Erionite, tradename TSZ-410KOA, $SiO_2/Al_2O_3$=7.4

C-6-3: Zeolite omega, tradename OM-01, $SiO_2/Al_2O_3$=6.4

C-6-4: Pulverized for 30 minutes by Perl mill

C-6-5: Pulverized for 60 minutes by Perl mill

C-6-6: Pulverized for 90 minutes by Perl mill

C-6-7: Ultra stable Y, tradename: HSZ-330HUA, $SiO_2/Al_2O_3$=6.1

C-6-8: Ultra stable Y, tradename: HSZ-350HUA, $SiO_2/Al_2O_3$=10.0

C-6-9: Ultra stable Y, tradename: HSZ-360HUA, $SiO_2/Al_2O_3$=14.0

C-7: ZSM-12 was prepared by hydrothermal synthesis ($SiO_2/Al_2O_3$=40). This zeolite was converted to a H form by a conventional method and then calcined at 400° C. for two hours in a nitrogen stream to obtain a catalyst.

C-8: ZSM-22 was prepared by hydrothermal synthesis ($SiO_2/Al_2O_3$=40). This zeolite was converted to a H form by a conventional method and then calcined at 400° C. for two hours in a nitrogen stream to obtain a catalyst.

C-9: Zeolite β (product of PQ Corporation; $SiO_2/Al_2O_3$=75; H form) was calcined at 950° C. for 3 hours in a air stream to obtain a catalyst.

C-10: 13.98 g of sodium aluminate (product of Wako Junyaku K. K., Al/NaOH=0.54) and 242.3 g of deionized water were put into a 1000 ml beaker to obtain a solution. Then, 123.2 g of a 40% aqueous solution of tetraethylammonium hydroxide (TEA.OH) (product of Aldorich Company) was added thereto, and the mixture was stirred. 90.12 g of white carbon (product of Tokuyama Soda Co., Ltd., fine silica powder, tradename: Tokusil-U) was put into a plastic container and the solution prepared as described above, was added thereto. Further, 124.2 g of deionized water was added thereto. The mixture was treated by a homogenizer at 5000 rpm for 10 minutes and then charged into a 2 l of SUS autoclave equipped with an inner cylinder made of teflon. The autoclave was flushed with nitrogen, and the mixture was reacted at 155° C. for 32 hours with stirring at 200 rpm. The composition of the mixture charged in the autoclave was as hollows: $SiO_2/Al_2O_3$=25.0, $OH^-/SiO_2$=0.29, $H_2O/SiO_2$=16.3, $Na/SiO_2$=0.15, and $TEA.OH/SiO_2$=0.22. After completion of the reaction, the reaction product was subjected to filtration, and then washed and dried at 120° C. for one day, to obtain 85 g of a white powder. This powder had a composition of $SiO_2/Al_2O_3$=22.2 and was found to be zeolite β having a purity of 100% by the powder X-ray diffraction analysis (as the standard product, zeolite β ($SiO_2/Al_2O_3$=25, H form) of PQ Corporation was employed). This zeolite was converted to a H form by a conventional method and then calcined at 950° C. for 3 hours in a nitrogen stream to obtain a catalyst.

C-11: 17.41 g of sodium aluminate (product of Wako Junyaku K. K. Al/NaOH=0.54) and 242.3 g of deionized water was put into a 1000 ml beaker to obtain solution. Then, 123.2 g of a 40% aqueous solution of tetraethylammonium hydroxide (TEA.OH) was added thereto, and the mixture was stirred.

90.3 g of white carbon (product of Tokuyama Soda Co., Ltd., fine silica powder, tradename: Tokusil-U) was added to the above solution, and 124.2 g of deionized water was further added thereto. The mixture was treated by a homogenizer at 5000 rpm for 10 minutes and then charged into a 2 l SUS autoclave equipped with an inner cylinder made of teflon. The autoclave was flushed with nitrogen, and the mixture was reacted at 163° C. for 92 hours with stirring at 200 rpm. The composition was as follows: $SiO_2/Al_2O_3$= 20.0, $OH^-/SiO_2$=0.31, $H_2O/SiO_2$=16.3, $Na/SiO_2$=0.19 and $TEA.OH/SiO_2$=0.22.

After completion of the reaction, the reaction product was subjected to filtration, then washed and dried at 120° C. for one day, to obtain 96 g of white powder. This powder had a composition of $SiO_2/Al_2O_3$=20.2 and was found to be zeolite β having a crystallinity of 100% by the powder X-ray diffraction analysis (as the standard product, zeolite β ($SiO_2/Al_2O_3$=25, H form) of PQ Corporation was employed).

This zeolite was converted to a H form by a conventional method and then calcined at 950° C. for 3 hours in a nitrogen stream to obtain a catalyst.

C-12-1:ZSM-5 ($SiO_2/Al_2O_3$=30, H form) was calcined at 400° C. for 3 hours in a nitrogen stream to obtain a catalyst.

C-12-2:ZSM-5 ($SiO_2/Al_2O_3$=100, H form) was calcined at 400° C. for 3 hours in a nitrogen stream to obtain a catalyst.

C-12-3:ZSM-11 ($SiO_2/Al_2O_3$=121, H form) was calcined at 400° C. for 3 hours in a nitrogen stream to obtain a catalyst.

EXAMPLES 1 TO 32

1.33 g of a catalyst, 38.0 g THF and 6.31 g of acetic anhydride were put into a glass container and reacted under atmospheric pressure at 40° C. with stirring in a nitrogen atmosphere. The weight ratio of the catalyst to THF was 0.035, and the molar ratio of acetic anhydride to THF was 0.117. The results are shown in Table 1.

TABLE 1

| No. | Catalyst | Reaction time (hr) | Mn | Mw | Mw/Mn | Yield (%) | Notes |
|---|---|---|---|---|---|---|---|
| 1 | C-1-1 | 0.5 | 1,966 | 4,920 | 2.5 | 20 | |
|  |  | 1.0 | 2,066 | 4,903 | 2.4 | 25 | |
|  |  | 2.0 | 1,621 | 4,180 | 2.6 | 39 | |
|  |  | 4.0 | 1,256 | 3,597 | 2.9 | 50 | |
|  |  | 6.0 | 1,059 | 3,324 | 3.1 | 53 | |
| 2 | C-1-2 | 8.0 | 750 | 2,820 | 3.7 | 64 | φ/φe = 98% |
| 3 | C-4 | 5.0 | 1,100 | 3,750 | 3.4 | 8 | |
| 4 | C-5-1 | 1.0 | 750 | 2,570 | 3.4 | 0.6 | |
|  |  | 3.0 | 900 | 3,990 | 4.4 | 1.7 | |
|  |  | 5.0 | 900 | 3,250 | 3.6 | 2.2 | |
| 5 | C-5-2 | 5.0 | 1,990 | 9,270 | 4.7 | 3.2 | |
| 6 | C-5-3 | 5.0 | 2,270 | 7,000 | 3.1 | 3.8 | |
| 7 | C-5-3 | 10.0 | 3,590 | 10,100 | 2.8 | 6.0 | |
| 8 | C-6-1 | 5.0 | 630 | 2,040 | 3.2 | 4.9 | |
| 9 | C-6-2 | 5.0 | 1,540 | 3,810 | 2.5 | 6.4 | |
| 10 | C-6-2 | 10.0 | 1,850 | 7,520 | 4.1 | 13 | |
| 11 | C-6-3 | 5.0 | 1,060 | 2,187 | 2.1 | 8.3 | |
| 12 | C-6-3 | 5.0 | 980 | 2,710 | 2.8 | 13.2 | Catalyst/THF (weight ratio) was 0.052. |
| 13 | C-6-3 | 5.0 | 680 | 1,690 | 2.5 | 10.7 | Catalyst/THF (weight ratio) was 0.052, and the reaction temp. was 50° C. |
| 14 | C-6-4 | 5.0 | 1,050 | 3,130 | 3.0 | 12.5 | |
| 15 | C-6-5 | 5.0 | 970 | 3,010 | 3.1 | 13.2 | |
| 16 | C-6-6 | 5.0 | 930 | 2,160 | 2.3 | 14.6 | |
| 17 | C-6-7 | 5.0 | 280 | 600 | 2.2 | 21.0 | |
| 18 | C-6-8 | 5.0 | 340 | 650 | 1.9 | 35.4 | |
| 19 | C-6-9 | 5.0 | 490 | 850 | 1.7 | 41.8 | |
| 20 | C-7 | 5.0 | 940 | 11,630 | 12.4 | 7.9 | |
| 21 | C-7 | 10.0 | 1,300 | 19,170 | 14.8 | 9.0 | |
| 22 | C-8 | 5.0 | 990 | 2,500 | 2.5 | 2.4 | |
| 23 | C-8 | 10.0 | 1,000 | 3,650 | 3.6 | 22 | |
| 24 | C-1-15 | 5.0 | 1,320 | 2,660 | 2.0 | 29 | φ/φe = 45% |
| 25 | C-1-16 | 5.0 | 1,320 | 2,690 | 2.0 | 20 | φ/φe = 31% |
| 26 | C-1-17 | 5.0 | 9,500 | 18,230 | 1.9 | 19 | φ/φe = 30% |
| 27 | C-12-1 | 1.0 | 3,050 | 98,110 | 32.2 | 12.4 | The viscosity of the reaction solution increased sharply, so that it was |

TABLE 1-continued

| No. | Catalyst | Reaction time (hr) | Mn | Mw | Mw/Mn | Yield (%) | Notes |
|---|---|---|---|---|---|---|---|
| 28 | C-12-2 | 1.0 | 3,408 | 132,370 | 38.8 | 3.8 | difficult to continue stirring, and the reaction was stopped after one hour. same as above |
| 29 | C-12-3 | 1.0 | 5,012 | 126,580 | 25.3 | 14.6 | same as above |
| 30 | C-1-12 | 5.0 | 940 | 2,180 | 2.3 | 48 | |
| 31 | C-1-13 | 5.0 | 790 | 1,460 | 1.8 | 46 | |
| 32 | C-1-14 | 5.0 | 770 | 1,260 | 1.6 | 51 | |

EXAMPLES 33 TO 44

1.05 g of a catalyst, 30.0 g of THF and 4.98 g of acetic anhydride were put into a glass container and reacted under atmospheric pressure at 40° C. with stirring in a nitrogen atmosphere. The weight ratio of the catalyst to THF was 0.035, and the molar ratio of acetic anhydride to THF was 0.117.

The results are shown in Table 2.

TABLE 2

| No. | Catalyst | Reaction time (hr) | Mn | Mw | Mw/Mn | Yield (%) | φ/φe (%) |
|---|---|---|---|---|---|---|---|
| 33 | C-2-1 | 5.0 | 1,160 | 2,840 | 2.5 | 59 | 90 |
| 34 | C-2-2 | 5.0 | 1,270 | 3,510 | 2.8 | 50 | 77 |
| 35 | C-2-3 | 5.0 | 1,450 | 3,450 | 2.4 | 49 | 76 |
| 36 | C-2-4 | 5.0 | 1,300 | 3,020 | 2.3 | 46 | 70 |
| 37 | C-2-5 | 5.0 | 970 | 2,500 | 2.6 | 41 | 63 |
| 38 | C-2-6 | 5.0 | 1,270 | 3,080 | 2.4 | 26 | 40 |
| 39 | C-2-7 | 5.0 | 810 | 1,930 | 2.4 | 22 | 34 |
| 40 | C-2-8 | 5.0 | 950 | 2,440 | 2.6 | 20 | 31 |
| 41 | C-2-9 | 5.0 | 3,040 | 6,130 | 2.0 | 13 | 21 |
| 42 | C-2-10 | 5.0 | 900 | 2,160 | 2.4 | 35 | 54 |
| 43 | C-2-11 | 5.0 | 1,160 | 3,330 | 2.9 | 48 | 74 |
| 44 | C-2-12 | 5.0 | 802 | 2,650 | 3.3 | 39 | 59 |

EXAMPLES 45 TO 56

1.0 g of a catalyst, 30.0 g of THF and 5.0 g of acetic anhydride were put into a glass container and reacted under atmospheric pressure at 40° C. with stirring in a nitrogen atmosphere. The weight ratio of the catalyst to THF was 0.033, and the molar ratio of acetic anhydride to THF was 0.12.

The results are shown in Table 3.

TABLE 3

| No. | Catalyst | Reaction time (hr) | Mn | Mw | Mw/Mn | Yield (%) | φ/φe (%) |
|---|---|---|---|---|---|---|---|
| 45 | C-1-8 | 5.0 | 750 | 1,130 | 1.5 | 45 | 69 |
| 46 | C-1-7 | 5.0 | 680 | 1,100 | 1.6 | 43 | 66 |
| 47 | C-1-6 | 5.0 | 890 | 2,070 | 2.3 | 56 | 86 |
| 48 | C-1-5 | 5.0 | 1,030 | 2,930 | 2.8 | 53 | 82 |
| 49 | C-1-4 | 5.0 | 1,170 | 3,150 | 2.7 | 54 | 82 |
| 50 | C-1-3 | 5.0 | 1,340 | 3,950 | 2.9 | 57 | 87 |
| 51 | C-1-11 | 5.0 | 680 | 1,120 | 1.6 | 42 | 65 |
| 52 | C-1-10 | 5.0 | 740 | 2,520 | 3.4 | 42 | 64 |
| 53 | C-1-9 | 5.0 | 1,010 | 3,260 | 3.2 | 50 | 77 |
| 54 | C-9 | 5.0 | 660 | 910 | 1.4 | 37 | 58 |

TABLE 3-continued

| No. | Catalyst | Reaction time (hr) | Mn | Mw | Mw/Mn | Yield (%) | φ/φe (%) |
|---|---|---|---|---|---|---|---|
| 55 | C-10 | 5.0 | 660 | 1,060 | 1.6 | 44 | 68 |
| 56 | C-11 | 5.0 | 680 | 1,120 | 1.6 | 48 | 75 |

EXAMPLE 57

1.00 g of catalyst C-1-1, 3.00 g of THF and 0.002 g of water were put into a reactor and reacted under atmospheric pressure at 40° C. for 5 hours with stirring in a nitrogen atmosphere. Resulted PTMG had Mn=36,700, and the yield was 23%.

EXAMPLE 58

1.00 g of catalyst C-1-1, 3.00 g THF and 0.002 g of 1,4-butandiol were put into a reactor and reacted under atmospheric pressure at 40° C. for 5 hours with stirring in a nitrogen atmosphere. Resulted PTMG had Mn=27,600, and the yield was 37%.

EXAMPLE 59

1.35 g of catalyst C-1-1 and 10.02 g of THF were put into a reactor and left to stand at room temperature for 20 hours without stirring. Resulted PTMG had Mn=34,000, and the yield was 15%.

EXAMPLES 60 TO 62

1.05 g of a catalyst, 30.0 g of THF and 2.49 g of acetic anhydride were put into a glass reactor and reacted under atmospheric pressure at 40° C. for 5 hours with stirring in a nitrogen atmosphere. The molar ratio of acetic anhydride to THF was 0.059. The analytical results of the reaction product are shown in Table 4.

TABLE 4

| No. | Catalyst | Reaction time (hr) | Mn | Mw | Mw/Mn | Yield (%) | φ/φe (%) |
|---|---|---|---|---|---|---|---|
| 60 | C-2-1 | 5.0 | 1,430 | 4,090 | 2.9 | 56 | 87 |
| 61 | C-2-5 | 5.0 | 1,430 | 3,700 | 2.6 | 60 | 92 |
| 62 | C-2-7 | 5.0 | 1,370 | 3,240 | 2.4 | 48 | 73 |

EXAMPLES 63 TO 64

1.05 g of a catalyst, 30.0 g of THF and 1.00 g of acetic anhydride were put into a glass reactor and reacted under atmospheric pressure at 40° C. for 5 hours with stirring in a nitrogen atmosphere. The molar ratio of acetic anhydride to THF was 0.024. The analytical results of the reaction product are shown in Table 5.

TABLE 5

| No. | Catalyst | Reaction time (hr) | Mn | Mw | Mw/Mn | Yield (%) | φ/φe (%) |
|---|---|---|---|---|---|---|---|
| 63 | C-2-1 | 5.0 | 3,060 | 7,120 | 2.3 | 54 | 84 |
| 64 | C-2-7 | 5.0 | 2,710 | 5,260 | 1.9 | 42 | 64 |

EXAMPLES 65 TO 68

7.9 g of catalyst C-3-1 was packed into a jacketed reaction tube having an inner diameter of 8 mm and a length of 50 cm. While maintaining the temperature of the jacket at 40° C., a THF solution containing acetic anhydride was passed through the reaction tube at a rate of 2 ml/min (up-flow). The retention time of the THF solution was 12.5 minutes. The analytical results of the product upon expiration of 5 hours after the initiation of the reaction are shown in Table 6.

TABLE 6

| No. | Acetic anhydride/ THF (molar ratio) | Mn | Mw | Mw/Mn | Yield (%) | φ/φe (%) | Notes |
|---|---|---|---|---|---|---|---|
| 65 | 0.04 | 2,620 | 5,190 | 3.2 | 23 | 35 | |
| 66 | 0.06 | 2,100 | 6,720 | 3.2 | 24 | 37 | |
| 67 | 0.12 | 1,541 | 5,860 | 3.8 | 21 | 33 | |
| 68 | 0.12 | 1,306 | 4,305 | 3.3 | 36 | 56 | Flow rate was 1 ml/min. |

EXAMPLES 69 TO 82

16.6 g of a catalyst was packed into a jacketed SUS reaction tube (internal capacity: 48 cc) having an inner diameter of 20 mm and a length of 150 mm. THF containing acetic anhydride was passed therethrough at a rate of 2.3 ml/min (up-flow). The retention time of the THF solution was 21 minutes. The analytical results of the product upon expiration of 5 hours after the initiation of the reaction are shown in Table 7.

TABLE 7

| No. | Acetic anhydride/THF (molar ratio) | Catalyst | Jacket Temp.(°C.) | Mn | Mw | Mw/Mn | Yield (%) | φ/φe (%) | Notes |
|---|---|---|---|---|---|---|---|---|---|
| 69 | 0.12 | C-3-1 | 40 | 1,050 | 3,030 | 2.9 | 35 | 54 | Analytical results of the product upon expiration of 3 hours after initiation of the reaction |
| 70 | 0.06 | C-3-1 | 40 | 1,360 | 4,610 | 3.4 | 36 | 55 | |
| 71 | 0.06 | C-3-1 | 30 | 1,660 | 4,970 | 3.0 | 32 | 44 | |
| 72 | 0.06 | C-3-2 | 40 | 940 | 2,410 | 2.6 | 23 | 36 | |
| 73 | 0.12 | C-3-2 | 40 | 710 | 1,500 | 2.1 | 27 | 41 | |
| 74 | 0.03 | C-3-2 | 40 | 1,260 | 3,650 | 2.9 | 28 | 43 | |
| 75 | 0.06 | C-3-3 | 40 | 950 | 2,410 | 2.5 | 29 | 45 | |
| 76 | 0.06 | C-3-4 | 40 | 880 | 2,350 | 2.7 | 28 | 44 | |
| 77 | 0.06 | C-3-2 | 40 | 905 | 2,390 | 2.6 | 41 | 63 | Flow rate was 1.2 ml/min. |
| 78 | 0.06 | C-3-2 | 30 | 1,270 | 2,960 | 2.3 | 21 | 29 | |
| 79 | 0.06 | C-3-2 | 30 | 1,160 | 2,840 | 2.5 | 36 | 49 | Flow rate was 1.2 ml/min. |
| 80 | 0.06 | C-3-5 | 40 | 870 | 2,270 | 2.6 | 30 | 45 | |
| 81 | 0.06 | C-3-2 | 40 | 840 | 2,050 | 2.4 | 57 | 88 | Flow rate was 0.6 ml/min. |
| 82 | 0.06 | C-3-1 | 40 | 970 | 3,130 | 3.2 | 15 | 24 | Flow rate was 4.6 ml/min. |

What is claimed is:

1. A method for producing a polyoxyalkylene glycol, comprising ring opening polymerizing in the liquid phase and in a non-oxidizing atmosphere a cyclic ether in the presence of a zeolite catalyst having a structure selected from the group consisting of the following structure type codes "Atlas of Zeolite Structure Types Third Edition" edited by W. M. Meier and D. H. Olson, 1992; BEA, EMT, ERI, EUO, FAU, HEU, LTA, LTL, MAZ, MOR, MTW, NES, OFF and TON, or selected from MCM-22, ZSM-21, NU3, NU6, NU-85, PSH-3 or MCM-41, the ratio of the catalyst to the liquid phase being within the range of from 0.001 to 50 times by weight.

2. The method for producing a polyoxyalkylene glycol according to claim 1, wherein tetrahydrofuran is used as the cyclic ether, and polytetramethylene ether glycol is produced by this polymerization.

3. The method for producing a polyoxyalkylene glycol according to claim 1, wherein the zeolite is a zeolite of a structure selected from the group consisting of the following structure type codes:

BEA, ERI, EUO, FAU, LTL, MAZ, MOR, MTW, OFF.

4. The method for producing a polyoxyalkylene glycol according to claim 1, wherein the zeolite is a zeolite selected from the group consisting of zeolite β, zeolite L, zeolite omega, mordenite, offretite, erionite and ultra stable Y as well as EU-1, ZSM-12 and MCM-22.

5. The method for producing a polyoxyalkylene glycol according to claim 4, wherein the zeolite is a zeolite selected from the group consisting of zeolite β, zeolite omega, offretite, erionite and ultra stable Y as well as EU-1, ZSM-12 and MCM-22.

6. The method for producing a polyoxyalkylene glycol according to claim 1, wherein the zeolite is an ultra stable Y.

7. The method for producing a polyoxyalkylene glycol according to claim 1, wherein the zeolite is a zeolite β.

8. The method for producing a polyoxyalkylene glycol according to claim 1, wherein the zeolite is a zeolite selected from the group consisting of ZSM-21, NU-3, NU-6, NU-85, PSH-3 and MCM-41.

9. The method for producing a polyoxyalkylene glycol according to claim 8, wherein the zeolite is MCM-22.

10. The method for producing a polyoxyalkylene glycol according to claim 1, wherein the zeolite is a metallo-aluminosilicate having a skeletal structure of zeolite β and having a part or all of aluminum and/or silicon in the skeletal structure isomorphously substituted by a metal.

11. The method for producing a polyoxyalkylene glycol according to claim 10, wherein the zeolite is a metallo-aluminosilicate having a skeletal structure of zeolite β, wherein the metal species isomorphously substituted in the aluminosilicate is at least one metal species selected from the group consisting of chromium, gallium, boron, iron, lead, tin, copper, indium, cobalt, nickel, zinc, vanadium, molybdenum, arsenic, antimony, manganese, germanium, silver, lanthanum, cadmium, magnesium, cerium and phosphorus.

12. The method for producing a polyoxyalkylene glycol according to claim 10, wherein the zeolite is a metallo-aluminosilicate having a skeletal structure of zeolite β, wherein the metal species isomorphously substituted in the aluminosilicate is at least one metal species selected from the group consisting of chromium, gallium, boron, iron, lead, tin, copper, indium, cobalt, nickel and zinc.

13. The method for producing a polyoxyalkylene glycol according to claim 1, wherein the zeolite is a zeolite treated with ammonium fluoride.

14. The method for producing a polyoxyalkylene glycol according to claim 1, wherein the zeolite is a zeolite subjected to calcination treatment at a temperature of from 400° C. to 1150° C.

15. The method for producing a polyoxyalkylene glycol according to claim 1, wherein the zeolite is a zeolite subjected to calcination treatment at a high temperature of from 400° C. to 1150° C. in a steam-containing gas atmosphere.

16. The method for producing a polyoxyalkylene glycol according to claim 1, wherein the zeolite has, as a part or whole of exchangable cations in the interior of its tetrahedral structure, at least one type of cations selected from the group consisting of hydrogen ion, ammonium ion and metal ions of an alkali metal, an alkaline earth metal, chromium, gallium, boron, iron, lead, tin, copper, indium, cobalt, nickel, zinc, vanadium, molybdenum, arsenic, antimony, manganese, germanium, silver, lanthanum, cadmium, magnesium, cerium and phosphorus.

17. The method for producing a polyoxyalkylene glycol according to claim 1, wherein the number average molecular weight of the polyoxyalkylene glycol is from 200 to 40,000.

18. The method for producing a polyoxyalkylene glycol according to claim 17, wherein the number average molecular weight of the polyoxyalkylene glycol is from 200 to 3,000.

19. The method for producing a polyoxyalkylene glycol according to claim 1, wherein the ring opening polymerization is conducted in the presence of an acid anhydride, and then the terminals of the obtained polymer are converted to hydroxyl groups.

20. The method for producing a polyoxyalkylene glycol according to claim 1, wherein the ring opening polymerization is conducted in the presence of a polar solvent.

21. The method for producing a polyoxyalkylene glycol according to claim 1, wherein said cyclic ether consists essentially of tetrahydrofuran.

* * * * *